United States Patent
Walker

[15] 3,639,834
[45] Feb. 1, 1972

[54] MICROWAVE MOISTURE MEASUREMENT APPARATUS HAVING MOVABLE MIRROR SCANNING MEANS

[72] Inventor: Charles W. E. Walker, 855 McBride Blvd., Apt. 307, New Westminster, British Columbia, Canada

[22] Filed: Apr. 17, 1970

[21] Appl. No.: 29,441

[52] U.S. Cl. .................................................. 324/58.5 B
[51] Int. Cl. .................................................. G01r 27/04
[58] Field of Search .................................... 324/58, 58.5

[56] References Cited

UNITED STATES PATENTS 3,278,841 10/1966 Hanson et al. ..................... 324/58.5

*Primary Examiner*—Edward E. Kubasiewicz
*Attorney*—Buckhorn, Blore, Klarquist and Sparkman

[57] ABSTRACT

A microwave apparatus for measuring the moisture content of sheet material by producing a moisture signal proportional to the amount of microwaves absorbed by the water therein is described which employs a movable mirror scanning means for scanning the sheet material with a microwave beam transmitted between fixed transmitting and receiving antennas. A fixed mirror is positioned on the opposite side of the sheet from such scanning means for receiving the microwave beam reflected from a first movable mirror and reflecting the beam back through the sheet material to a second movable mirror. The movable mirrors are mounted on a carriage which is reciprocated back and forth across the moving sheet by a reversible motor coupled to a potentiometer for producing a position signal proportional to the position of such carriage. This position signal and the moisture signal are applied to the inputs of a computer for indicating the percentage moisture content of a sheet portion and its position on the sheet. The microwave beam passes through the sheet at an acute angle, in the range of 40° to 65°, to prevent standing wave interference distortion of the microwave beam. A telescope and light source are employed for optical alignment of the antennas and the movable mirrors.

15 Claims, 3 Drawing Figures

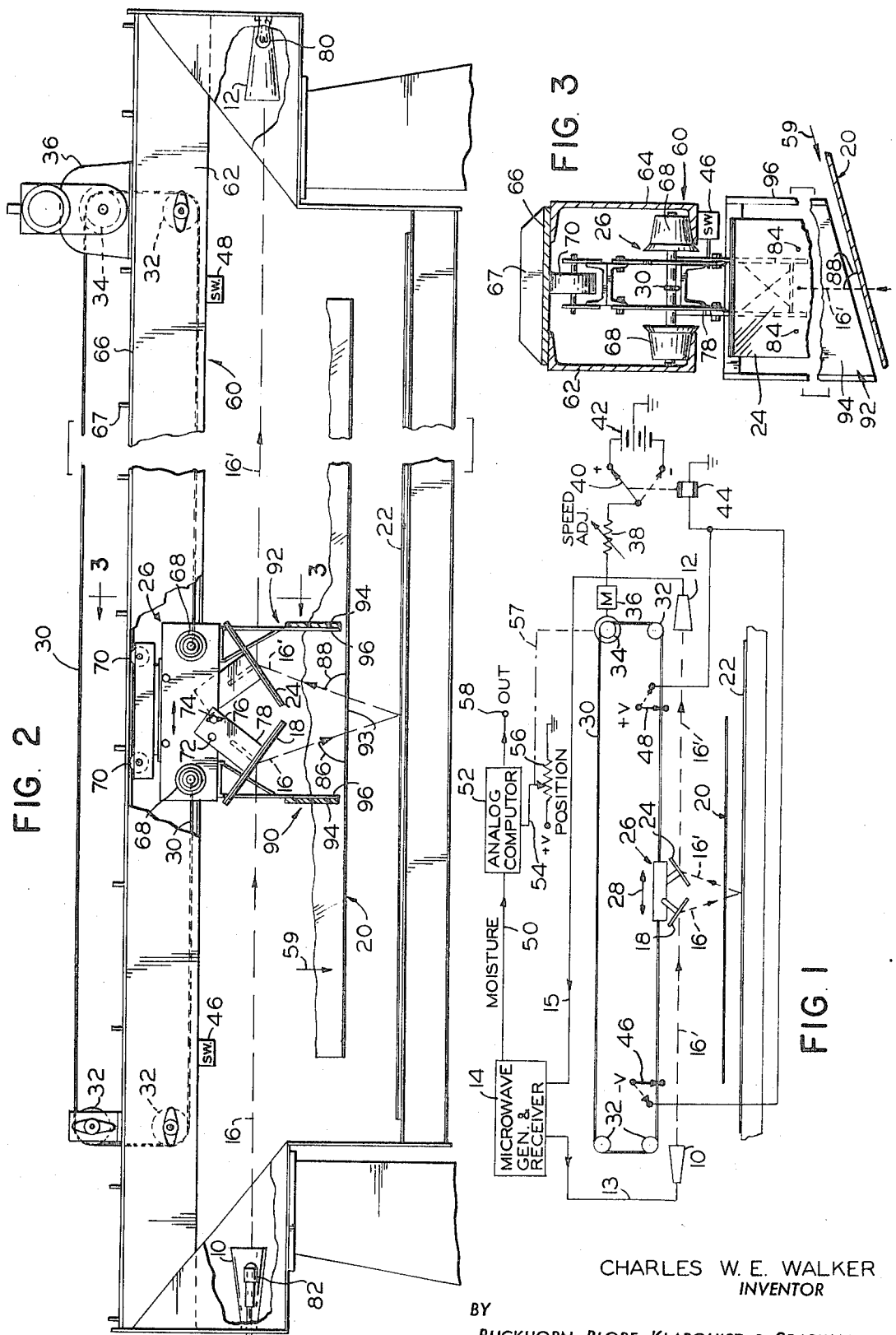

MICROWAVE MOISTURE MEASUREMENT APPARATUS HAVING MOVABLE MIRROR SCANNING MEANS

BACKGROUND OF THE INVENTION

The subject matter of the present invention relates generally to microwave moisture measurement apparatus used to determine the moisture content of sheet materials, including thin layers of particulate material, and in particular to such a microwave apparatus employing fixed transmitting and receiving antennas and a movable mirror scanning means for reflecting the microwave beam through different portions of the sheet material. The apparatus of the present invention is especially useful in the measurement of the moisture content of such sheet materials as paper, plywood, lumber, and layers of wood chips, with an accuracy of up to ±0.1 percent water content.

The present application is a continuation in part of my previous United States patent application, Ser. No. 633,940, now U.S. Pat. No. 3,534,260 filed Aug. 26, 1967, for METHOD AND APPARATUS FOR MEASURING MOISTURE CONTENT IN SHEET MATERIALS.

Previous apparatus for mechanical scanning of the microwave beam across the entire width of moving sheet material have moved the microwave transmitting and receiving antennas and associated equipment, as shown in my earlier U.S. Pat. No. 3,255,408, issued June 7, 1966. To a similar effect is U.S. Pat. No. 3,278,841 of Hanson et al. In addition, U.S. Pat. No. 3,460,031 of Evans et al. shows a scanner in the form of a movable wave guide section for the microwaves, such wave guide section being split into two separate portions to form a moisture measurement probe. The apparatus of the present invention is considerably more simplified by employing a movable mirror scanning means which enables the microwave transmitting antenna and receiving antenna and associated wave guide apparatus to be maintained in a fixed position.

The use of microwave mirrors to reflect the microwave beam through the same portion of the sheet material several times for greater absorption and improved accuracy is shown in my above-mentioned copending application, Ser. No. 633,440, which also discloses that the beam should strike the sheet material at an acute angle between 40° and 65°, and preferably at approximately 53°, to prevent the signal reflections therefrom from producing standing wave patterns between the sheet material and the antennas which would otherwise cause interference distortion of the microwave beam.

It is, therefore, one object of the present invention to provide a microwave moisture measurement apparatus of simple and inexpensive construction, which operates in an accurate trouble-free manner, in which a microwave beam is scanned across the sheet material being measured by a movable mirror means while employing fixed transmitting and receiving antennas.

Another object of the invention is to provide such an apparatus in which standing wave patterns, due to microwave reflections between the sheet material and the antennas, are prevented, thereby eliminating the distortion in the output signal of the receiving antenna which tends to be caused by standing wave interference.

A further object of the invention is to provide such an apparatus which transmits the microwave beam several times through the sheet material to provide moisture measurements of high accuracy.

An additional object of the invention is to provide such a microwave apparatus with a mirror carriage means which can be supported in any position, thereby increasing the versatility of such apparatus.

Still another object of the present invention is to provide such an apparatus in which the drive means for moving the mirror carriage means also operates a position indicating means to produce a position signal corresponding to the position of the sheet portion whose moisture is being measured, and means for transmitting such position signal and the moisture content signal to a computer or other signal processing means whose output provides an indication of the moisture distribution over the entire width.

BRIEF DESCRIPTION OF THE DRAWINGS

Other objects and advantages of the present invention will be apparent from the following detailed description of a preferred embodiment thereof and from the attached drawings of which:

FIG. 1 is a simplified schematic diagram showing the scanning mirror drive means, the microwave antennas and electrical circuit associated with such drive means, and antennas;

FIG. 2 is a front elevation view of one embodiment of the microwave apparatus of the present invention with parts broken away for clarity; and FIG. 3 is a vertical section view taken along the line 3—3 of FIG. 2.

DESCRIPTION OF THE PREFERRED EMBODIMENT

As shown in FIG. 1, the microwave moisture measurement apparatus of the present invention includes a fixed microwave transmitting antenna 10 and a fixed microwave receiving antenna 12 respectively connected by a first wave guide 13 to the output of a microwave generator circuit and by a second wave guide 14 to the input of a microwave receiving circuit in a microwave generator and receiver apparatus 15 of conventional type. A pulsed microwave beam 16, of 10.688 gigaHertz frequency pulse modulated by a rectangular pulse signal of 3.5 kilohertz and free of frequency modulation, is transmitted from antenna 10 to a first movable mirror 18 which reflects the beam down through a sheet 20 of paper or other sheet material whose moisture content is being measured. A portion of the microwave beam is absorbed by the water in the sheet portion traversed by such beam and the remainder of the beam continues on until it strikes a fixed microwave mirror 22 of aluminum or other suitable metal which reflects such beam back through the sheet 20. During its second pass through the sheet material 20, another portion of the microwave beam is absorbed by the water in such sheet and the remaining unabsorbed beam portion 16' is transmitted to a second movable mirror 24 which reflects such beam portion to the receiving antenna 12.

The first and second movable mirrors 18 and 24 are adjustably mounted on a movable carriage 26 which is reciprocated back and forth in the direction of the double headed arrow 28 laterally across the sheet material 20 to cause the microwave beam to scan the entire width of such sheet material as the sheet material moves longitudinally. This reciprocating movement of the mirror carriage 26 may be accomplished by a cable 30 having its opposite ends attached to the ends of the carriage 26 and passing over a plurality of guide rollers 32 and around a motor driven pulley 34. A reversible electric motor 36 is suitably geared to the drive pulley 34 and is electrically connected through a speed adjustment potentiometer 38 and a reversing switch 40 to the opposite terminals of a DC power supply 42. Of course, an AC motor can be employed instead by making suitable changes in the reversing switch and power supply.

The reversing switch 40 has a movable contact which is actuated by a solenoid 44 when one of a pair of limit switches 46 and 48 are engaged by the mirror carriage 26 at the opposite sides of the sheet material. Thus, when the movable contact of limit switch 46 is engaged by the carriage moving to the left and closed to the dash line position, a negative voltage −V is applied to the solenoid 44 causing the movable contact of the reversing switch 40 to move to its negative voltage dash line position. This reverses the direction of the electrical motor 36 and causes the carriage to move back to the right. When limit switch 48 is closed by carriage 26, the other limit switch 46 is automatically opened by another solenoid (not shown) and a positive voltage +V is applied to the solenoid 44 to cause the reversing switch 40 to move into the positive voltage solid line position. As a result, the motor 46 is again reversed to cause the carriage to move back to the left. The speed of movement of the motor 36 may be adjusted by the potentiometer 38 between about 5 and 20 feet per minute.

The output signal of the receiving antenna 12 is transmitted to the microwave receiver circuit 14 to produce a moisture signal at the output thereof which is applied through conductor 50 to one input of an analog computer 52. A position signal which may be in the form of a DC voltage is applied to another input of the computer 52 by the movable contact 54 of a potentiometer 56 having one end terminal connected to a source of positive DC voltage and its other end terminal grounded. The movable contact 54 of the potentiometer 56 is mechanically coupled by a suitable coupling 57 to the shaft of the drive pulley 34 for movement with the mirror carriage 26 and thereby produces a position signal voltage which is proportional to the lateral position of such carriage over the sheet material 20. The sheet material 20 is also moving longitudinally, as indicated by arrow 59, at an acute angle to the plane of the drawing and at right angles to the movement of the carriage 26 so that the movable mirror means 18 and 24 scans the entire surface of the sheet with the microwave beam.

The computer 52 processes the moisture and position signals and is coupled at its output 58 to a suitable utilization device, such as a strip chart recorder which is driven at a constant speed related to the longitudinal speed of the sheet 20 for indicating the moisture content of the sheet portion traversed by the microwave beam 16 and 16' as well as the position of such sheet portion on the sheet 20. For greater speed, accuracy and convenience, it may be desirable to employ a digital computer, in which case a digital pulse generator is employed to produce the position signal as a binary coded digital signal and an analog to digital converter is provided in line 50 for converting the analog moisture signal to a digital signal.

As shown in FIGS. 2 and 3, one embodiment of the apparatus of the present invention includes an overhead track 60 formed by a pair of beams 62 and 64 of U-shaped cross section which are fastened along the top of such beams to the bottom of a metal plate 66 having a plurality of stiffening ribs 67 attached across the top of such plate. The movable mirror carriage 26 is mounted between the two beams 62 and 64 on four wheels 68 which engage the lower flanges of such beams. The mirror carriage 26 is also provided with a pair of guide rollers 70 which engage the underside of the plate 66. This construction enables the carriage to be mounted in any position because the wheels 66 are held on the track by the pressure of the guide rollers 70 and do not depend upon gravity for this. This enables the apparatus to measure the moisture content of sheet materials traveling in a vertical position as well as in the horizontal position shown.

The movable mirrors 18 and 24 are each adjustably mounted on the sides of the carriage 26 by bolts 72 and 74. Bolts 74 extend through an elongated slot 76 in each of a pair of spaced support plates 78 welded to the back of the mirror. This enables the mirror to be pivoted about bolt 72 into different angles of adjustment and, when in the desired position, bolt 74 is tightened to hold the mirror in such position. The microwave antennas 10 and 12 and the movable mirrors 18 and 24 are optically aligned by a light source 80 and a telescope 82 supported on different ones of the antennas 10 and 12, as shown in FIG. 2. A pair of alignment holes 84 of about ¼ inch diameter are provided through each of the movable mirrors 18 and 24. The antennas 10 and 12 are aligned with each other by sighting the light source through the holes 84 and adjusting the position of the antennas until the light spot is centered on the cross wires of the telescope. Then the mirrors 18 and 24 are adjusted until a somewhat diffused image of the light source reflected by the mirrors is brought into coincidence with the light spot of the alignment holes 84 to correctly align such mirrors with the sheet material removed. It should be noted that another light source and telescope (not shown) are provided on the opposite side of the antenna from those shown, such additional light source being attached to antenna 10 and such additional telescope being attached to antenna 12. This provides an extremely accurate alignment so that the microwave beam 16 emitted from the transmitting antenna 10 is reflected at the proper angle by the two movable mirrors 18 and 24 to cause the unabsorbed portion 16' of such beam to reach the receiving antenna 12.

The microwave beam 16 strikes the sheet material 20 at an acute angle 86 and the unabsorbed microwave beam portion 16' leaves the sheet material at an acute angle 88, which angles are both in the range of between 40° and 65° and are preferably about 53°, to prevent standing wave patterns due to microwave reflections between the sheet material and the antennas, as indicated in my above-mentioned U.S. patent application, Ser. No. 633,940, now U.S. Pat. No. 3,534,260. Since the microwave beam is not frequency modulated, these standing wave patterns can be produced and tend to cause interference distortion of the microwave beam 16' transmitted to the receiving antenna 12. To prevent this, it has been found desirable to provide microwave absorbers 90 and 92 positioned on opposite sides of the sheet portion 93 being measured and attached to the mirror carriage 26 for movement therewith. These microwave absorbers may each include an absorbing layer of plastic foam material 94 containing carbon or other conductive particles which is coated on the outer surface of a metal support plate 96. Thus, the two absorber means 90 and 92 prevent any portion of the microwave beam 16 from passing directly between the transmitting antenna 10 and the receiving antenna 12 without being reflected by the movable mirrors 18 and 24. This would be possible since some of such microwave beam energy could go under the movable mirrors and be reflected from the upper surface of the sheet material directly to the receiving antenna which, of course, would cause distortion in the output signal of such antenna. In addition, similar microwave absorbing material may be provided on the inner side of the beams 62 and 64 forming the carriage track, as well as the other metal support members for the antennas. It should be noted that the microwave reflections from the upper surface of the sheet material 20 do not strike the movable mirrors because the sheet material is inclined longitudinally at an acute angle with respect to the beams 16 and 16', as shown in FIG. 3.

It will be obvious to those having ordinary skill in the art that many changes may be made in the above-described details of the preferred embodiment of the present invention without departing from the spirit of the invention. For example, the fixed mirror 22 can be replaced by additional movable mirror mounted on a second carriage whose movement is synchronized with the carriage 26. In this case, the movable mirror 24 is eliminated, and the receiving antenna 12 is positioned on the opposite side of the sheet 20 so that the microwave beam 16 passes only once through such sheet and is reflected by such additional movable mirror directly to the receiving antenna. Therefore, the scope of the present invention should only be determined by the following claims.

I claim:

1. Microwave apparatus for measuring the moisture content of sheet material, comprising:
   microwave transmitter means including an output antenna mounted in a fixed position for generating a beam of microwave signals of a frequency so that when said beam is transmitted through said sheet material a portion of the beam is absorbed by the moisture in the sheet material;
   mirror means including at least one movable mirror for reflecting the microwave beam to cause said beam to be transmitted through a sheet portion of said sheet material;
   scanner means for moving the movable mirror relative to the sheet material to scan the beam of microwaves across the sheet material and cause said beam to be transmitted through different sheet portions; and microwave receiver means including an input antenna mounted in a fixed position for receiving the microwave beam after it is transmitted through the sheet material, and for converting the received microwaves into an electrical signal proportional to the moisture content of the sheet portion traversed by said beam.

2. Microwave apparatus in accordance with claim 1 which also includes a position signal generator means for producing an electrical signal corresponding to the position of the microwave beam on the sheet material.

3. Microwave apparatus in accordance with claim 2 which also includes signal processing means having inputs connected to the outputs of the position signal generator means and the microwave receiver means for combining the moisture signal and the position signal to indicate the moisture content of the sheet portion and the position of said sheet portion on said sheet.

4. Microwave apparatus in accordance with claim 1 which also includes feeder means for moving the sheet material longitudinally and in which the scanner means moves the microwave beam laterally across the moving sheet material.

5. Microwave apparatus in accordance with claim 4 in which the mirror means includes two movable mirrors and a fixed mirror fixedly mounted on the opposite side of the sheet material from the two movable mirrors.

6. Microwave apparatus in accordance with claim 1 in which the scanner means includes a movable carriage on which the movable mirror is supported for movement across the sheet material.

7. Microwave apparatus in accordance with claim 6 in which the wheels of the carriage are supported on a track by guide roller means for enabling said carriage to be mounted in any position.

8. Microwave apparatus in accordance with claim 6 in which the scanner means includes a reversible motor means for reciprocating the carriage back and forth across the width of the sheet material.

9. Microwave apparatus in accordance with claim 6 in which the transmitter means directs the microwave beam in a first direction substantially parallel to the sheet material onto a first movable mirror which reflects the beam in a second direction through the sheet material onto a fixed mirror, the fixed mirror reflects the beam in a third direction through the sheet material again onto a second movable mirror, and the second movable mirror reflects the beam to the receiver means in a fourth direction substantially parallel to the sheet material.

10. Microwave apparatus in accordance with claim 8 which also includes optical alignment means for aligning the microwave antenna of the transmitter means with the microwave antenna of the receiver means and for aligning the movable mirrors with said antenna, said alignment means including a telescope and a light source attached to different ones of the antennas, and sighting holes provided through the two movable mirrors.

11. Microwave apparatus in accordance with claim 1 in which the microwave beam is free of frequency modulation and the beam strikes the sheet material at an acute angle to prevent the microwaves reflected by said sheet material from producing standing wave patterns which tend to cause interference distortion of the microwave beam.

12. Microwave apparatus in accordance with claim 11 in which the acute angle is in the range of 40° to 65°.

13. Microwave apparatus in accordance with claim 11 in which the acute angle is approximately 53°.

14. Microwave apparatus in accordance with claim 6 which also includes a microwave absorber member mounted on said carriage for movement with said movable mirror to position said absorber member between said sheet portion and said output antenna.

15. Microwave apparatus in accordance with claim 9 which also includes a pair of microwave absorber members mounted on said carriage for movement with said movable mirrors to position one absorber member between said sheet portion and said output antenna and to position the other absorber member between said sheet portion and said input antenna.

* * * * *